US012747814B2

(12) United States Patent
Oh et al.

(10) Patent No.: US 12,747,814 B2
(45) Date of Patent: Sep. 29, 2026

(54) CONNECTOR FOR PIPING

(71) Applicants: Hanon Systems, Daejeon (KR); HWAYOUNG CO., LTD., Busan (KR)

(72) Inventors: Seung Kyu Oh, Daejeon (KR); Jong Su Kim, Daejeon (KR); Jin Uk Kim, Daejeon (KR); Sang Chul Byon, Daejeon (KR); Kil Sang Yoon, Daejeon (KR); Young Wook Cho, Daejeon (KR); Sung Been Cheon, Daejeon (KR); Su Jin An, Gimhae-si (KR); Dong Young Kim, Gimhae-si (KR)

(73) Assignees: HANON SYSTEMS, Daejeon (KR); HWAYOUNG CO., LTD., Busan (KR)

( * ) Notice: Subject to any disclaimer, the term of this patent is extended or adjusted under 35 U.S.C. 154(b) by 0 days.

(21) Appl. No.: 19/104,349

(22) PCT Filed: Oct. 6, 2023

(86) PCT No.: PCT/KR2023/015401

§ 371 (c)(1),
(2) Date: Feb. 17, 2025

(87) PCT Pub. No.: WO2024/080673

PCT Pub. Date: Apr. 18, 2024

(65) Prior Publication Data

US 2026/0063229 A1 Mar. 5, 2026

(30) Foreign Application Priority Data

Oct. 11, 2022 (KR) ........................ 10-2022-0129968

(51) Int. Cl.
*F16L 37/14* (2006.01)
*F16L 37/088* (2006.01)

(52) U.S. Cl.
CPC ........... *F16L 37/144* (2013.01); *F16L 37/088* (2013.01)

(58) Field of Classification Search
CPC .............................. F16L 37/144; F16L 37/088
See application file for complete search history.

(56) References Cited

U.S. PATENT DOCUMENTS 3,215,455 A * 11/1965 Andres .................. F16L 39/00 285/125.1
4,836,580 A * 6/1989 Farrell ................ F16L 25/0045 285/133.11

(Continued)

FOREIGN PATENT DOCUMENTS

| | | |
|---|---|---|
| EP | 1770321 | 4/2007 |
| JP | 2019056448 | 4/2019 |
| KR | 1020040015691 | 2/2004 |

OTHER PUBLICATIONS

International Search Report and Written Opinion issued on Jan. 12, 2024 for corresponding application No. PCT/KR2023/015401.

(Continued)

*Primary Examiner* — James M Hewitt, II
(74) *Attorney, Agent, or Firm* — NORTON ROSE FULBRIGHT US LLP

(57) ABSTRACT

The present invention relates to a connector for piping. A connector for piping according to an embodiment of the present invention may include a female connector, male connectors respectively coupled to two opposite sides of the female connector and having beads protruding from outer peripheral surfaces thereof, and first locking members each having one surface with which the bead engages when the first locking member moves on a chamber portion when the male connector is coupled in a state in which the first locking (Continued)

members are temporarily coupled to the chamber portions formed at two opposite sides of the female connector.

14 Claims, 9 Drawing Sheets

(56) References Cited

U.S. PATENT DOCUMENTS

| | | | | |
|---|---|---|---|---|
| 10,422,459 | B2 * | 9/2019 | Jones | F16L 37/144 |
| 11,320,075 | B2 * | 5/2022 | Zhou | F16L 37/1225 |
| 2010/0127492 | A1 | 5/2010 | Poder | |
| 2016/0201835 | A1 | 7/2016 | Jones et al. | |
| 2016/0281894 | A1 | 9/2016 | Freter | |
| 2018/0328525 | A1 | 11/2018 | Kerin, Jr. | |

OTHER PUBLICATIONS

Official Action issued Jun. 29, 2026 in related Korean Patent Application No. 10-2022-0129968, 19 pgs.

* cited by examiner

[FIG. 2]
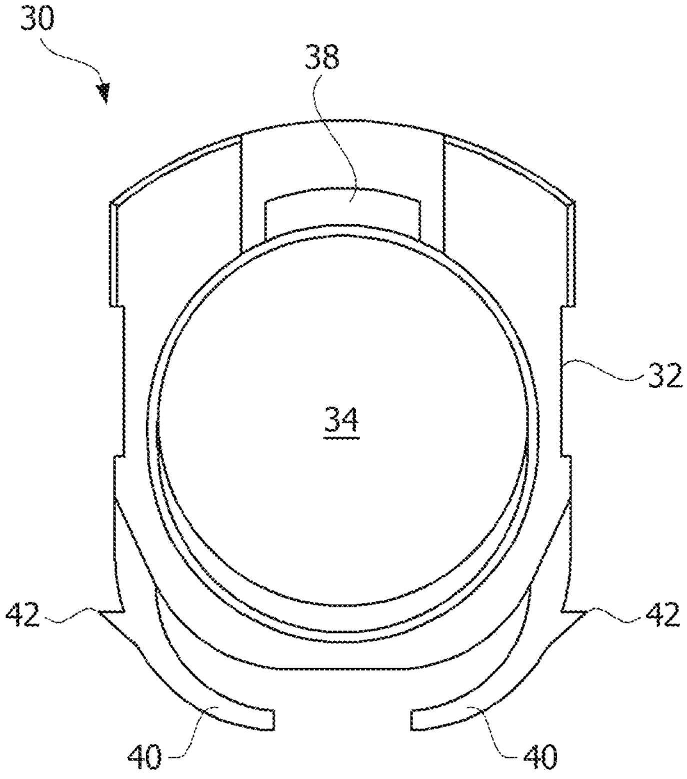

[FIG. 3]
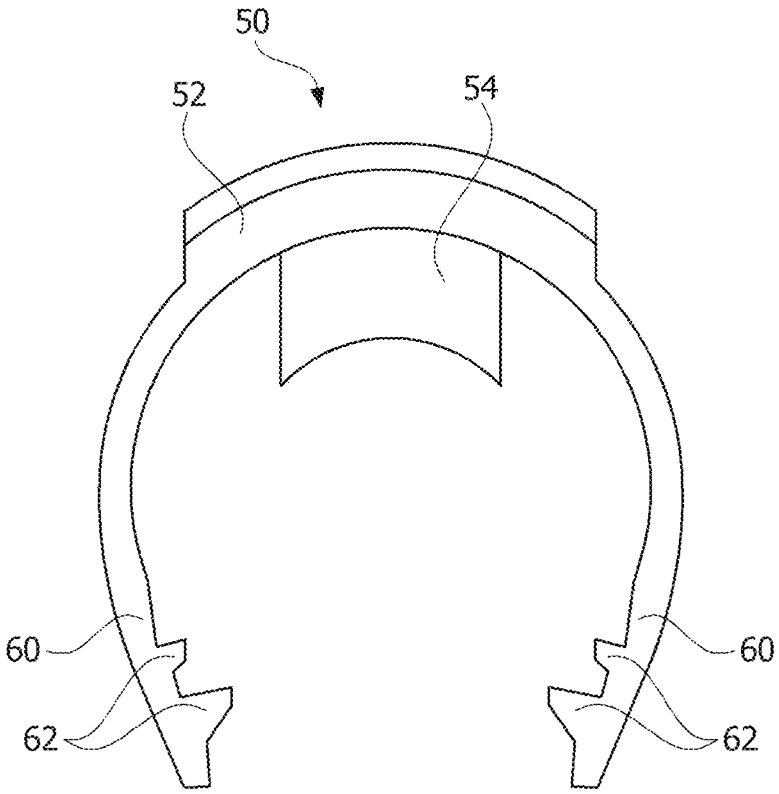

[FIG. 4]
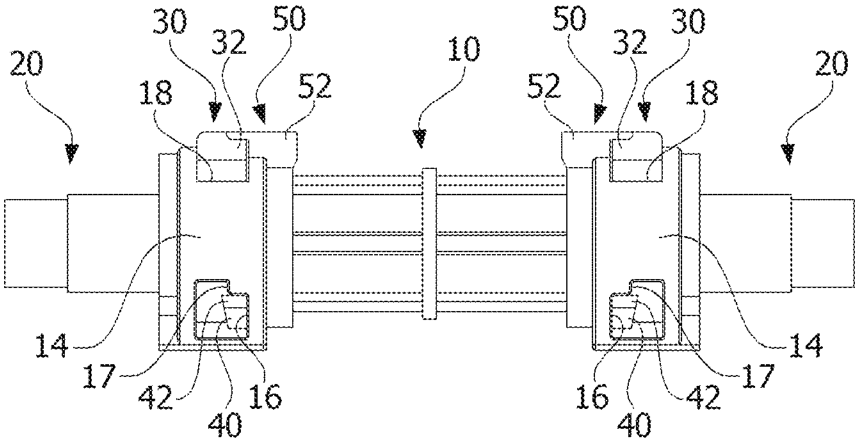

[FIG. 5]
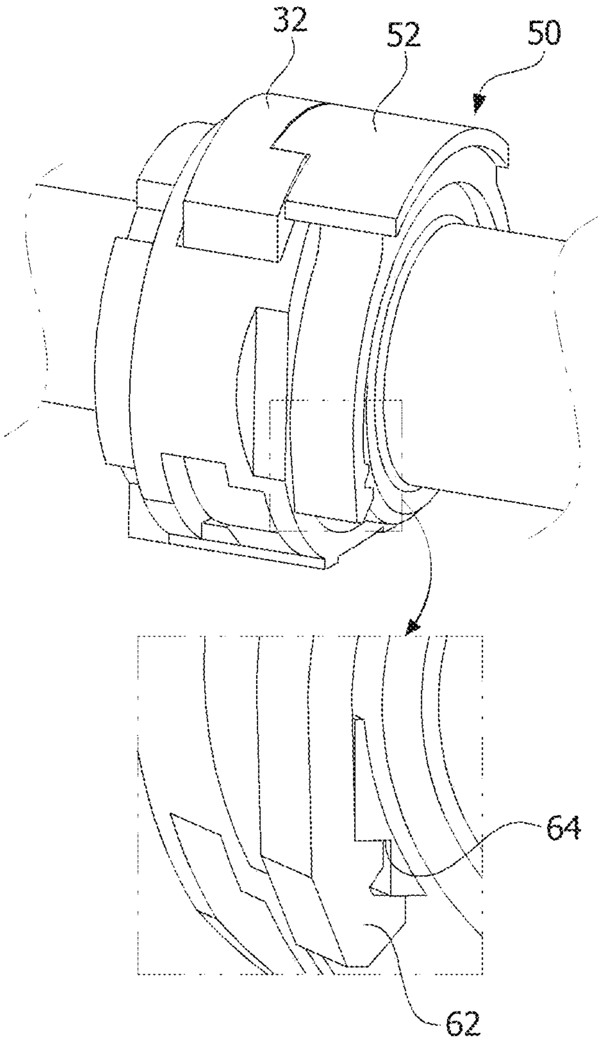

[FIG. 6]
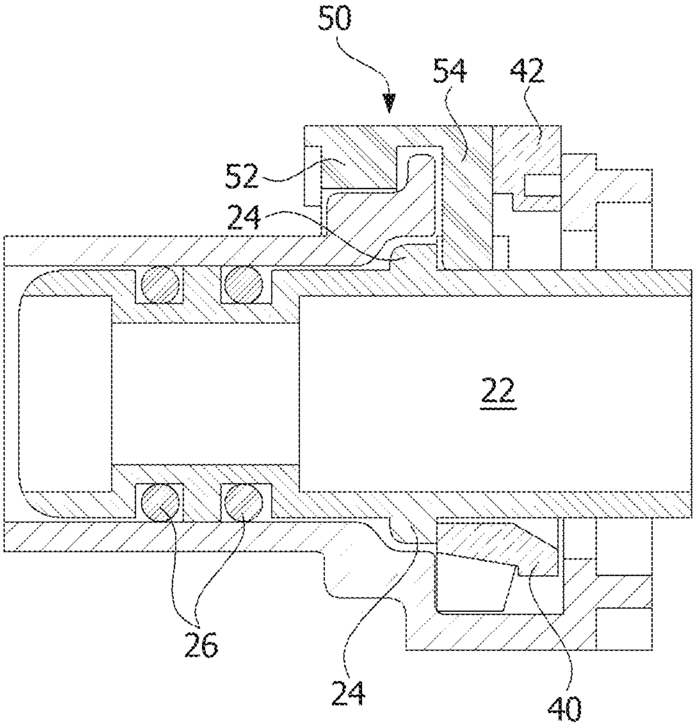

[FIG. 7]
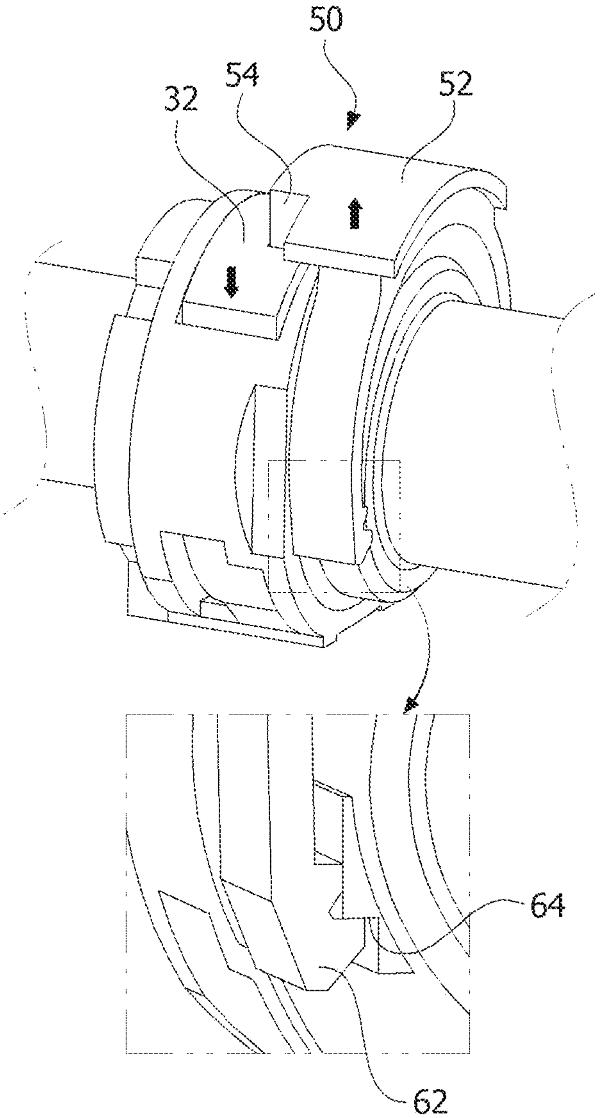

[FIG. 8]
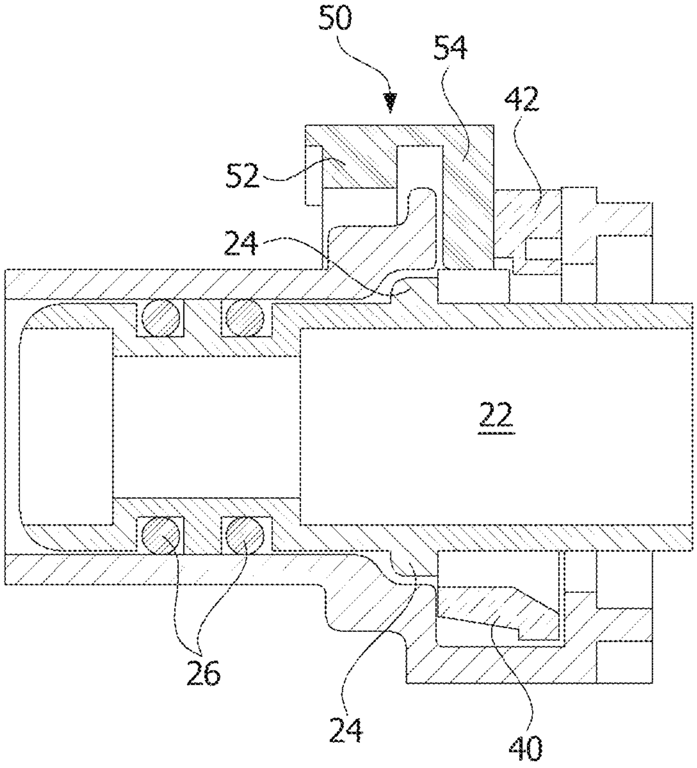

[FIG. 9]
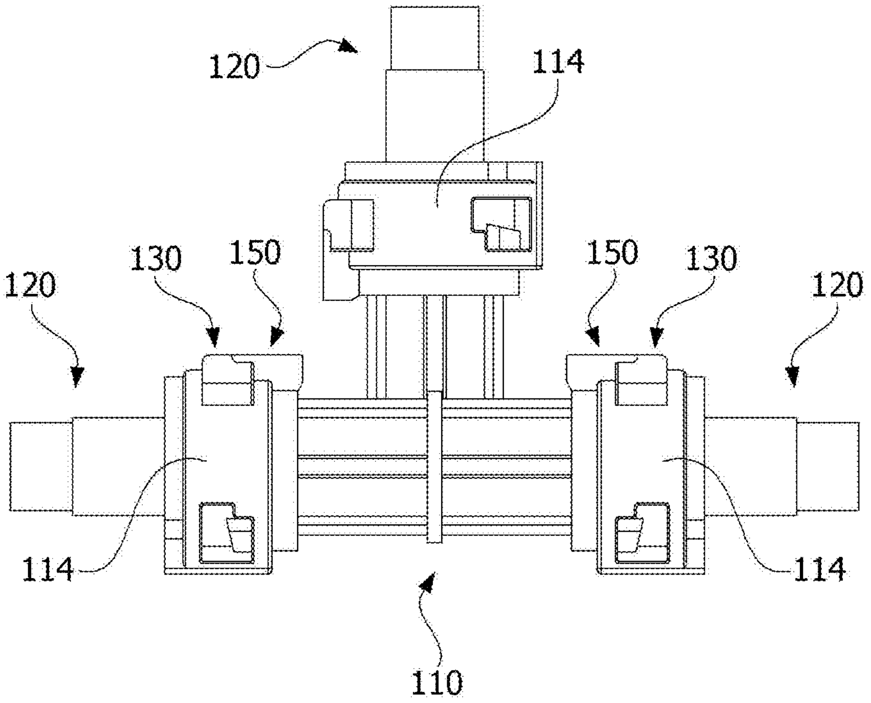

CONNECTOR FOR PIPING

CROSS REFERENCE TO RELATED APPLICATIONS

The present application is a national phase application under 35 U.S.C. § 371 of International Application No. PCT/KR2023/015401, filed Oct. 6, 2023, which claims the benefit of priority to Korean Patent Application No. 10-2022-0129968, filed Oct. 11, 2022, each of which are incorporated herein by reference in their entirety.

TECHNICAL FIELD

The present invention relates to a connector for piping.

BACKGROUND ART

A general cooling system includes an evaporator configured to absorb heat from the surrounding, a compressor configured to compress a refrigerant, a condenser configured to discharge heat to the surrounding, and an expansion valve configured to expand the refrigerant.

In the cooling system, a gaseous refrigerant introduced into the compressor from the evaporator is compressed into a high-temperature, high-pressure refrigerant by the compressor, and liquefaction heat is discharged to the surrounding during a process in which the compressed gaseous refrigerant is liquefied while passing through the condenser. Further, the liquefied refrigerant comes into a low-temperature, low-pressure wet saturated vapor state while passing through the expansion valve again, and then the refrigerant is introduced back into the evaporator, such that the refrigerant absorbs vaporization heat from the surrounding while being vaporized and cool the surrounding air. Therefore, a single cooling cycle is implemented.

In the cooling system, various types of pipes are used to allow the refrigerant to flow, and connectors with various shapes are used to connect the pipes. A connector in the related art is configured by coupling a female connector and a male connector. There are problems in that a separate process, such as swaging or thermal bonding, needs to be performed on an end of the female connector to couple the female connector and the male connector, an O-ring needs to be provided on the female connector, and an additional component, such as a spacer or a retainer, is required to fix the O-ring.

DISCLOSURE

Technical Problem

An object of the present invention is to provide a connector for piping, in which the number of processes of connecting or disconnecting a female connector and a male connector, which constitute the connector, is reduced, and the male connectors are respectively connected to two opposite sides of the female connector, which makes it easy to connect pipes.

In addition, an object of the present invention is to provide a connector for piping, in which an O-ring is provided on a male connector, and a separate component for fixing the O-ring to a female connector is not required, such that the number of components and costs may be reduced.

In addition, an object of the present invention is to provide a connector for piping, in which a female connector and a male connector may be more securely coupled, which may improve rupture and tensile performance.

Technical Solution

A connector for piping according to an embodiment of the present invention may include: a female connector; male connectors respectively coupled to two opposite sides of the female connector and having beads protruding from outer peripheral surfaces thereof; first locking members each having one surface with which the bead engages when the first locking member moves on a chamber portion when the male connector is coupled in a state in which the first locking members are temporarily coupled to the chamber portions formed at two opposite sides of the female connector; and second locking members with which upper portions of the beads engage when the second locking members are coupled to the female connector after the male connectors are coupled to the female connector.

The first locking member may provide an elastic force in a direction perpendicular to an axial direction of the female connector in a state in which the bead engages with the first locking member.

The first locking member may include: a first locking body having a through-hole penetrated by the male connector; and first elastic bodies protruding from a lower portion of the first locking body, provided to be in contact with an inner peripheral surface of the female connector, and configured to provide the elastic force.

The first elastic bodies may extend downward from two opposite sides of the lower portion of the first locking body, and the first elastic bodies may have leg shapes curvedly extending in a direction in which tip portions thereof face each other.

First engagement hooks may respectively protrude from two opposite sides of the first elastic bodies and engage with fastening projections formed at two opposite sides of the female connector.

A guide surface may be formed to be inclined inside the first locking body, and the bead may climb over the guide surface when the male connector is coupled.

The guide surface may be formed to be inclined upward and rearward from a front surface of the first locking body.

The second locking member may include: a second locking body coupled to an outer surface of the female connector and having a bead locking portion with which an upper portion of the bead engages when the second locking body is coupled to the female connector; and second elastic bodies extending from two opposite sides of the second locking body and configured to provide elastic forces in a direction in which the second elastic bodies surround an outer peripheral surface of the female connector.

The bead locking portion may have an interlocking protrusion that engages with the second locking body so that the first locking member and second locking member move together when the first locking member and second locking member are uncoupled.

An interlocking groove may be formed in the first locking body and opened downward, and the interlocking protrusion may engage with the interlocking groove.

A second engagement hook may protrude inward from the second elastic body and engage with a fastening groove formed in an outer peripheral surface of the female connector.

Coupling portions may be provided at two opposite sides of the female connector and coupled to the male connectors, tool holes may be formed in the coupling portions, and a tool may be inserted into the tool holes to uncouple the male connectors.

Engagement hooks may respectively protrude from two opposite sides of the first locking member and engage with fastening projections formed at the two opposite sides of the female connector.

The female connector may be formed in a shape bent at least partially.

An O-ring may be provided on an outer surface of the male connector and seal an inner surface of the female connector.

A connector for piping according to another embodiment of the present invention may include: a female connector; male connectors respectively coupled to ends of the female connector and having beads protruding from outer peripheral surfaces thereof; first locking members each having one surface with which the bead engages when the first locking member moves on a chamber portion when the male connector is coupled in a state in which the first locking members are temporarily coupled to the chamber portions formed at two opposite sides of the female connector; and second locking members with which upper portions of the beads engage when the second locking members are coupled to the female connector after the male connectors are coupled to the female connector, in which the female connector has three or more ends, and the male connectors are respectively coupled to the ends.

The female connector may be formed in a 'T' shape.

Advantageous Effects

According to the embodiment of the present invention, the number of processes of connecting or disconnecting the female connector and the male connector, which constitute the connector, is reduced, and the male connectors are respectively connected to the two opposite sides of the female connector, which makes it easy to connect the pipes.

In addition, according to the embodiment of the present invention, the O-ring is provided on the male connector, and a separate component for fixing the O-ring to the female connector is not required, such that the number of components and costs may be reduced.

In addition, according to the embodiment of the present invention, the female connector and the male connector are more securely coupled, which may improve rupture and tensile performance.

DESCRIPTION OF DRAWINGS

FIG. 2 is an exploded perspective view illustrating a rear surface of a first locking member of the connector for piping according to the embodiment of the present invention.

FIG. 3 is a view illustrating a rear surface of a second locking member of the connector for piping according to the embodiment of the present invention.

FIG. 4 is a view illustrating a coupled state of the connector for piping according to the embodiment of the present invention.

FIG. 5 is a view partially illustrating the coupled state of the connector for piping according to the embodiment of the present invention.

FIG. 6 is a cross-sectional view partially illustrating the coupled state of the connector for piping according to the embodiment of the present invention.

FIG. 7 is a view partially illustrating an uncoupled state of the connector for piping according to the embodiment of the present invention.

FIG. 8 is a cross-sectional view partially illustrating the uncoupled state of the connector for piping according to the embodiment of the present invention.

FIG. 9 is a view illustrating a coupled state of a connector for piping according to another embodiment of the present invention.

MODE FOR INVENTION

Figure 1:
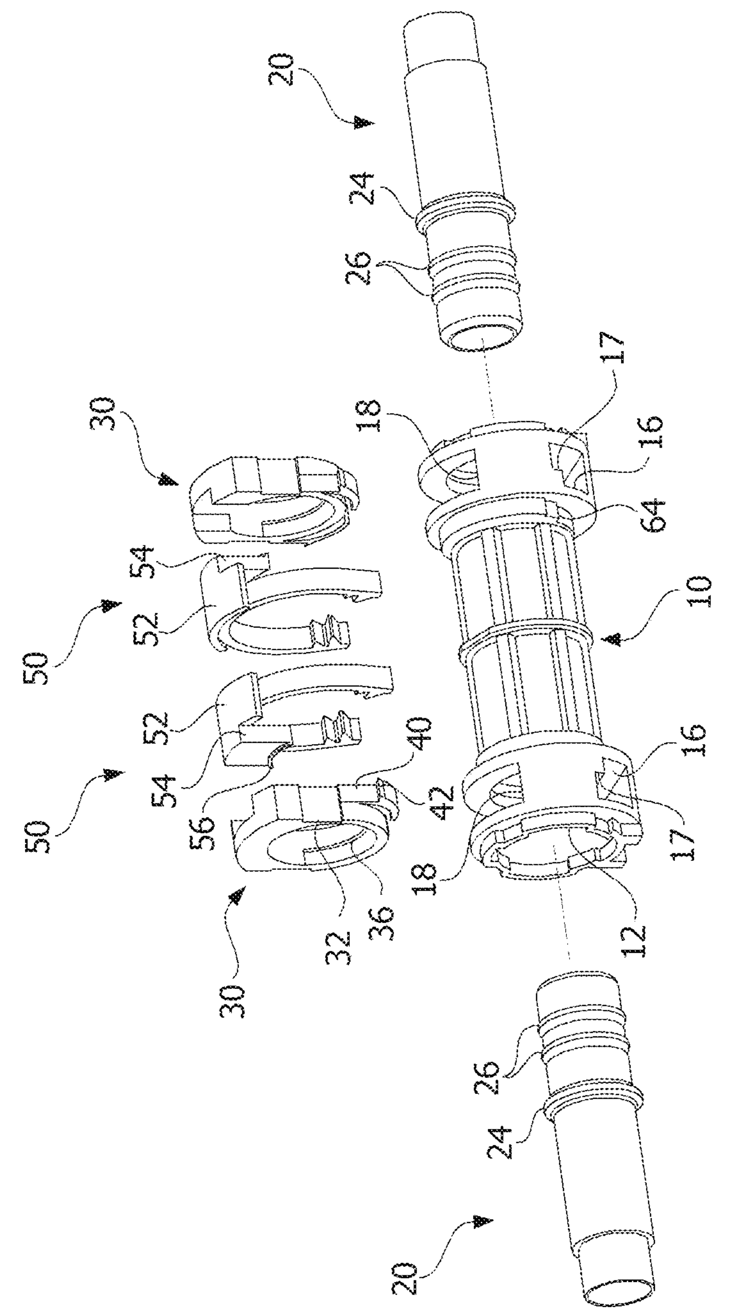
FIG. 1 is an exploded perspective view illustrating a connector for piping according to an embodiment of the present invention.

The present invention may be variously modified and may have various embodiments, and particular embodiments illustrated in the drawings will be described in detail below. However, the description of the exemplary embodiments is not intended to limit the present invention to the particular exemplary embodiments, but it should be understood that the present invention is to cover all modifications, equivalents and alternatives falling within the spirit and technical scope of the present invention. In the description of the present invention, the specific descriptions of publicly known related technologies will be omitted when it is determined that the specific descriptions may obscure the subject matter of the present invention.

The terms such as "first" and "second" may be used to describe various constituent elements, but the constituent elements should not be limited by the terms. These terms are used only to distinguish one constituent element from another constituent element.

The terminology used herein is used for the purpose of describing particular example embodiments only and is not intended to be limiting. Singular expressions include plural expressions unless clearly described as different meanings in the context. In the present application, the terms "comprises," "comprising," "includes," "including," "containing," "has," "having" or other variations thereof are inclusive and therefore specify the presence of stated features, integers, steps, operations, elements, components, and/or combinations thereof, but do not preclude the presence or addition of one or more other features, integers, steps, operations, elements, components, and/or combinations thereof.

In addition, throughout the specification, when one constituent element is referred to as being "connected to" another constituent element, one constituent element can be "directly connected to" the other constituent element, and one constituent element can also be "indirectly connected to," "physically connected to," or "electrically connected to" the other element with other elements therebetween. Further, the constituent elements are defined as different names according to positions or functions thereof, but the constituent elements may be integrated.

Hereinafter, embodiments of a manifold refrigerant module according to the present invention will be described in detail with reference to the accompanying drawings. In the description of the exemplary embodiments with reference to the accompanying drawings, the same or corresponding constituent elements are assigned with the same reference numerals, and the repetitive description thereof will be omitted.

FIG. 1 is an exploded perspective view illustrating a connector for piping according to an embodiment of the present invention, FIG. 2 is an exploded perspective view illustrating a rear surface of a first locking member of the connector for piping according to the embodiment of the present invention, FIG. 3 is a view illustrating a rear surface of a second locking member of the connector for piping according to the embodiment of the present invention, FIG. 4 is a view illustrating a coupled state of the connector for piping according to the embodiment of the present invention.

As illustrated, the connector for piping according to the embodiment of the present invention may include a female connector 10, male connectors 20 respectively coupled to two opposite sides of the female connector 10 and having beads 24 protruding from outer peripheral surfaces thereof, first locking members 30 each having one surface with which the bead 24 engages when the first locking member 30 moves on a chamber portion 18 when the male connector 20 is coupled in a state in which the first locking members 30 are temporarily coupled to the chamber portions 18 formed at two opposite sides of the female connector 10, and second locking members 50 with which upper portions of the beads 24 engage when the second locking members 50 are coupled to the female connector 10 after the male connectors 20 are coupled to the female connector 10.

The female connector 10 is formed in a pipe shape. An axial hole 12 is formed in an axial direction in the female connector 10, and the male connector 20 is inserted and coupled into the axial hole 12. The female connector 10 has coupling portions 14 respectively provided at two opposite sides so that the male connectors 20 may be bidirectionally coupled to the female connector 10. The coupling portion 14 is a portion substantially coupled to the male connector 20, the first locking member 30, and the second locking member 50 and integrated with the female connector 10. Although not illustrated specifically illustrated in the drawings, a catching projection may be provided in a central portion of the axial hole 12 so that one end of the male connector 20 engages with the catching projection when the male connector 20 is coupled. The catching projection may protrude in a ring shape in a circumferential direction in the axial hole 12.

The coupling portions 14 may be provided at the two opposite sides of the female connector 10 and have a relatively larger diameter than the central portion. Further, tool holes 16 are formed in the coupling portions 14 so that a tool for uncoupling the male connector 20 is inserted into the tool holes 16. The tool hole 16 may be formed to have a predetermined area along an outer peripheral surface of the female connector 10. The tool hole 16 needs to have a sufficient size so that the tool may be inserted into the tool hole 16. The two tool holes 16 may be formed at a predetermined interval at sides of the coupling portions 14 so that two blades of pliers, which is the tool used in the present embodiment, are respectively inserted into the tool holes 16.

Further, fastening projections 17 are formed to be stepped at upper ends of the tool holes 16 so that first engagement hooks 42 of the first locking members 30 engage with the fastening projections 17. When the first engagement hooks 42 engage with the fastening projections 17, the first locking members 30 and the female connector 10 are finally coupled.

As described above, the first engagement hooks 42 of the coupled first locking members 30 are positioned on the fastening projections 17 of the tool holes 16. An operator uncouples the first locking members 30 by pressing the first engagement hooks 42 in a state in which the two blades of the pliers are respectively inserted into the tool holes 16. As described below, the first locking members 30 are finally coupled as the first engagement hooks 42 engage with the fastening projections 17. In order to uncouple the first locking members 30, the first locking members 30 need to be preferentially unfastened from the fastening projections 17 of the first engagement hooks 42. In this case, as described above, the operator unfasten the first engagement hooks 42 by using the tool such as the pliers. As described above, in the present embodiment, the tool holes 16, into which the tool is inserted, are formed in the coupling portion 14, such that the first locking members 30 may be easily detached, which may improve assemblability of products. In addition, when the first locking member 30 is broken down, only the first locking member 30 may be detached and replaced by the tool, and the female connector 10 and the male connector 20 may be reused in an intact manner.

Meanwhile, the chamber portion 18 is formed at one side of the coupling portion 14, and the chamber portion 18 is a portion into which the first locking member 30 is inserted when the first locking member 30 is coupled. The chamber portion 18 is a portion into which the first locking member 30 is inserted. The chamber portion 18 has a shape corresponding to an outer surface of the locking member 30. The chamber portion 18 is approximately opened from an upper side to a lower side of the coupling portion 14, and the first locking member 30 may be inserted through the chamber portion 18 and temporarily coupled to the female connector 10. The chamber portion 18 may be formed at the upper side of the coupling portion 14 and opened in the circumferential direction so as to have a predetermined width. In order to couple the male connector 20, the first locking member 30 moves upward or downward on the chamber portion 18 so that the male connector 20 is coupled to or uncoupled from the female connector 10.

The male connectors 20 may be respectively coupled to the two opposite sides of the female connector 10. The male connector 20 is formed in a pipe shape like the female connector 10, and an axial hole 22, through which a refrigerant flows, is formed in the axial direction in the male connector 20. The male connector 20 has a smaller diameter than the female connector 10 and is inserted and coupled into the axial hole 12 of the female connector 10. As described above, in the present embodiment, the male connectors 20 are bidirectionally coupled to the two opposite sides of the female connector 10, such that pipes or hoses may be coupled to the male connectors 20, which may increase the range of application.

The bead 24 is provided on an outer peripheral surface of the male connector 20 and coupled to the female connector 10 and the first locking member 30. The bead 24 protrudes from the outer peripheral surface of the male connector 20. The bead 24 engages with one surface, i.e., a rear surface of the first locking member 30, such that the male connector 20 may be fixed in the axial direction.

Further, O-rings 26 are provided on the outer peripheral surface of the male connector 20 to implement sealing when the male connector 20 is coupled to the female connector 10. One or more O-rings 26 may be provided at a predetermined interval on the outer peripheral surface of the male connector 20. In the present embodiment, the O-ring 26 may be disposed at a position closer to the female connector 10 than the bead 24 and implement sealing. When the O-ring 26 is provided on the female connector 10 instead of the male connector 20, a separate component, such as a spacer or a retainer, is required to fix the position of the O-ring 26. In contrast, in the present embodiment, the O-ring 26 is provided on the male connector 20, such that the number of components of the male connector 20 may be reduced, and the costs may be reduced.

With reference to FIG. 2, the first locking member 30 may include a first locking body 32 having a through-hole 34 penetrated by the male connector 20, and first elastic bodies 40 protruding from a lower portion of the first locking body 32, provided to be in contact with an inner peripheral surface of the female connector 10, and configured to provide an elastic force.

The first locking member 30 may be inserted and coupled, from above to below, into the chamber portion 18 formed in the female connector 10. Because the first locking body 32 is coupled to the male connector 20 in the state in which the first locking body 32 is temporarily coupled to the female connector 10, the first locking body 32 has an approximately ring shape so that the male connector 20 is inserted into the first locking body 32.

Further, a guide surface 36 is formed to be inclined in the first locking body 32, i.e., at one side of the through-hole 34, and the bead 24 climbs over the guide surface 36 when the male connector 20 is coupled. The guide surface 36 may be formed rearward from a front surface of the first locking body 32 and have a predetermined length. The guide surface 36 may be formed to be inclined upward and rearward, such that the bead 24 may smoothly climb over the guide surface 36. The bead 24 climbs over the guide surface 36 and engages with one surface, i.e., the rear surface of the first locking body 32, such that the first locking body 32 may be coupled in the axial direction.

The first elastic bodies 40 may extend downward from two opposite sides of the lower portion of the first locking body 32. The first elastic bodies 40 may be made of an elastically deformable material (synthetic resin) and have leg shapes curvedly extending in a direction in which tip portions thereof face each other. With the above-mentioned shape, the first elastic bodies 40 may be pushed by being elastically deformed in the direction in which the first elastic bodies 40 face each other when an external force is applied in a perpendicular direction (from above to below).

The first engagement hooks 42 protrude from the two opposite sides of the first elastic bodies 40 and engage with the fastening projections 17 formed at the two opposite sides of the female connector 10. The first engagement hook 42 is a portion coupled to the female connector 10, and an upward movement of the first engagement hook 42 is restricted in the state in which the first engagement hook 42 is fastened to the fastening projection 17. The present drawings illustrate that the first engagement hooks 42 are provided at the two opposite sides of the elastic bodies 40. However, the present disclosure is not limited thereto. The first engagement hooks 42 may be provided at two opposite sides of the first locking bodies 32.

Meanwhile, an interlocking groove 38 is formed in an upper portion of a rear surface of the first locking body 32, and the interlocking groove 38 is opened downward. An interlocking protrusion 56 of a bead locking portion 54 engages with the interlocking groove 38. The interlocking groove 38 is opened downward as described above, such that when the second locking member 50 is moved upward in the state in which the interlocking groove 38 engages with the interlocking protrusion 56, the first locking member 30 may also be moved upward in conjunction with the second locking member 50.

With reference to FIG. 3, the second locking member 50 may include a second locking body 52 coupled to an outer surface of the female connector 10 and having the bead locking portion 54 with which an upper portion of the bead 24 engages when the second locking member 50 is coupled to the female connector 10, and second elastic bodies 60 extending from two opposite sides of the second locking body 52 and configured to provide an elastic force in a direction in which the second elastic bodies 60 surround the outer peripheral surface of the female connector 10.

The second locking member 50 may be coupled to surround the outer peripheral surface of the coupling portion 14 of the female connector 10. In this case, the second locking member 50 is in contact with an upper end of the first locking member 30 and restricts an upward movement of the first locking member 30.

The bead locking portion 54 is provided at one side of the second locking body 52 and provided to be in contact with the upper end of the first locking body 32, and the upper portion of the bead 24 engages with the bead locking portion 54. The bead locking portion 54 may substantially support the upper portion of the bead 24, thereby securely supporting the male connector 20 from above and below together with the first locking member 30. When the male connector 20 is doubly supported as described above, the female connector 10 and the male connector 20 are securely coupled, and the rupture and tensile performance may be improved.

The bead locking portion 54 has the interlocking protrusion 56 that engages with the interlocking groove 38 of the second locking body 32 so that the first locking member 30 and the second locking member 50 are moved upward when the first locking member 30 and the second locking member 50 are uncoupled. Therefore, the operator only needs to move only the second locking member 50 upward to uncouple the first locking member 30 and the second locking member 50, such that the uncoupling operation may be simplified.

Meanwhile, the second elastic bodies 60 extend from the two opposite sides of the second locking body 52 and surround the outer peripheral surface of the female connector 10. The second elastic bodies 60 are configured to couple the second locking member 50 to the female connector 10 and provide elastic forces in the direction in which the second elastic bodies 60 surround the outer peripheral surface of the female connector 10. Second engagement hooks 62 protrude inward from the second elastic bodies 60 and engage with fastening grooves 64 formed in the outer peripheral surface of the female connector 10. The second engagement hooks 62 may be provided as a plurality of second engagement hooks 62 respectively provided at two opposite sides.

FIG. 4 is a view illustrating a coupled state of the connector for piping according to the embodiment of the present invention, FIG. 5 is a view partially illustrating the coupled state of the connector for piping according to the embodiment of the present invention, FIG. 6 is a cross-sectional view partially illustrating the coupled state of the connector for piping according to the embodiment of the present invention, FIG. 7 is a view partially illustrating an uncoupled state of the connector for piping according to the embodiment of the present invention, and FIG. 8 is a cross-sectional view partially illustrating the uncoupled state of the connector for piping according to the embodiment of the present invention.

With reference to FIGS. 4 to 6, in order to couple the connector for piping, the first locking member 30 preferentially temporarily coupled by being inserted through the chamber portion 18 of the female connector 10 from above to below. In this state, in order to couple the male connectors 20, the male connectors 20 are inserted into the two opposite sides of the female connector 10.

During a process in which the male connector 20 is inserted, the bead 24 climbs over the guide surface 36. In this case, the first locking member 30 is pushed downward while being elastically supported by an insertion force of the male connector 20. The first locking member 30 is elastically supported by the first elastic bodies 40. The first locking member 30 is supported as the first elastic bodies 40 is elastically deformed downward, and the first engagement hooks 42 engage with the fastening projections 17.

The male connector 20, which has climbed over the guide surface 36, may be coupled to the female connector 10 as the bead 24 engages with the rear surface of the first locking member 30. In this case, the O-ring 26 of the male connector 20 is in contact with the inner peripheral surface of the female connector 10 and maintains a sealed state.

Next, when the second locking member 50 is pushed from above, the bead locking portion 54 engages with the upper portion of the bead 24. In this case, when the second engagement hooks 62 of the second elastic bodies 60 are in contact with the female connector 10 as described above, the upper and lower portions of the bead 24 are simultaneously supported by the first locking member 30 and the second locking member 50, such that the female connector 10 and the male connector 20 may be securely coupled, and the rupture and tensile performance may be improved.

The pipes, hoses, or the like may be easily connected to the two opposite sides of the finally coupled male connector 20. In addition, according to the finally coupled connector for piping, it is not necessary to perform separate processing, such as separate swaging or thermal bonding, on the end of the female connector 10.

With reference to FIGS. 7 and 8, the operator needs to uncouple the second locking member 50 first in order to uncouple the male connector 20 to perform maintenance. When the operator moves the second elastic bodies 60 at the two opposite sides in a lateral direction, the second engagement hook 62 may be uncoupled, and the second locking member 50 may be moved upward.

In this state, the operator pushes the upper end of the first locking member 30, such that the bead 24 and the locking protrusion 44 are unfastened, as illustrated in the drawings. In this state, when the operator moves the male connectors 20 bidirectionally, the male connectors 20 may be easily separated from the female connector 10 without interference with the first locking member 30 and the second locking member 50.

As described above, in the present embodiment, the female connector 10 and the male connectors 20 may be easily coupled or separated by means of the first locking member 30 and the second locking member 50, which may improve the convenience of the products.

FIG. 9 is a view illustrating a coupled state of a connector for piping according to another embodiment of the present invention. In the present drawings, the constituent elements identical to those in the above-mentioned embodiment are denoted by reference numerals with numbers of 100, and a description thereof will be omitted, for convenience.

With reference to this configuration, in the above-mentioned embodiment, a shape will be described in which male connectors 120 are coupled to two opposite sides of a female connector 110. According to the present embodiment, the female connector 110 not only extends toward two opposite sides but also extends upward, such that the male connectors 120 may be coupled to three portions. That is, the female connector 110 may be made to be divided into the three portions in a 'T' shape.

In the case of a vehicle equipped with a connector for refrigerant piping, a pipe having a shape divided into three portions may be provided in the vehicle. When the present connector is applied to the pipe shape, it is possible to reduce the inconvenience of having to separate the entire pipe during a process of replacing internal components. That is, only the pipe connected to the male connector 120 needs to be separated to replace an air conditioning device, an expansion valve, or the like mounted in the vehicle, such that the maintenance efficiency may be improved.

In addition, in the present embodiment, although not illustrated, the female connector 110 may have a straight shape, a 'T' shape, and a shape at least partially bent at 90°, 120°, or the like in accordance with a connection angle of the pipe.

While the present invention has been described above with reference to the particular embodiments, it may be understood by those skilled in the art that the present invention may be variously modified and changed without departing from the spirit and scope of the present invention disclosed in the claims.

| [Description of Reference Numerals] | |
|---|---|
| 10: Female connector | 12: Axial hole |
| 14: Coupling portion | 16: Tool hole |
| 17: Fastening projection | 18: Chamber portion |
| 20: Male connector | 22: Axial hole |
| 24: Bead | 26: O-ring |
| 30: First locking member | 32: First locking body |
| 34: Through-hole | 36: Guide surface |
| 38: Interlocking groove | 40: First elastic body |
| 42: First engagement hook | 50: Second locking member |
| 52: Second locking body | 54: Bead locking portion |
| 56: Interlocking protrusion | 60: Second elastic body |
| 62: Second engagement hook | 64: Fastening groove |

The invention claimed is:

1. A connector for piping, the connector comprising:

a female connector;

male connectors respectively coupled to two opposite sides of the female connector and having beads protruding from outer peripheral surfaces thereof;

first locking members each having one surface with which the bead engages when the first locking member moves on a chamber portion when the male connector is coupled in a state in which the first locking members are temporarily coupled to the chamber portions formed at two opposite sides of the female connector; and second locking members with which upper portions of the beads engage when the second locking members are coupled to the female connector after the male connectors are coupled to the female connector, wherein the first locking member comprises:

a first locking body having a through-hole penetrated by the male connector; and first elastic bodies protruding from a lower portion of the first locking body, provided to be in contact with an inner peripheral surface of the chamber portion, and configured to provide the elastic force, wherein the second locking member comprises:

a second locking body coupled to an outer surface of the female connector and having a bead locking portion inserted into the chamber portion, with which an upper portion of the bead engages when the second locking body is coupled to the female connector; and second elastic bodies extending from two opposite sides of the second locking body and configured to provide elastic forces in a direction in which the second elastic bodies surround an outer peripheral surface of the female connector, wherein a second engagement hook protrudes inward from the second elastic body and engages with a fastening groove formed in an outer peripheral surface of the female connector.

2. The connector of claim 1, wherein the first locking member provides an elastic force in a direction perpendicular to an axial direction of the female connector in a state in which the bead engages with the first locking member.

3. The connector of claim 2, wherein engagement hooks respectively protrude from two opposite sides of the first locking member and engage with fastening projections formed at the two opposite sides of the female connector.

4. The connector of claim 1, wherein the first elastic bodies extend downward from two opposite sides of the lower portion of the first locking body, and the first elastic bodies have leg shapes curvedly extending in a direction in which tip portions thereof face each other.

5. The connector of claim 1, wherein first engagement hooks respectively protrude from two opposite sides of the first elastic bodies and engage with fastening projections formed at two opposite sides of the female connector.

6. The connector of claim 5, wherein a guide surface is formed to be inclined inside the first locking body, and the bead climbs over the guide surface when the male connector is coupled.

7. The connector of claim 6, wherein the guide surface is formed to be inclined upward and rearward from a front surface of the first locking body.

8. The connector of claim 1, wherein the bead locking portion has an interlocking protrusion that engages with the second locking body so that the first locking member and second locking member move together when the first locking member and second locking member are uncoupled.

9. The connector of claim 8, wherein an interlocking groove is formed in the first locking body and opened downward, and the interlocking protrusion engages with the interlocking groove.

10. The connector of claim 1, wherein coupling portions are provided at two opposite sides of the female connector and coupled to the male connectors, tool holes are formed in the coupling portions, and a tool is inserted into the tool holes to uncouple the male connectors.

11. The connector of claim 1, wherein the female connector is formed in a shape bent at least partially.

12. The connector of claim 1, wherein an O-ring is provided on an outer surface of the male connector and seals an inner surface of the female connector.

13. A connector for piping, the connector comprising:

a female connector;

male connectors respectively coupled to ends of the female connector and having beads protruding from outer peripheral surfaces thereof;

first locking members each having one surface with which the bead engages when the first locking member moves on a chamber portion when the male connector is coupled in a state in which the first locking members are temporarily coupled to the chamber portions formed at two opposite sides of the female connector; and second locking members with which upper portions of the beads engage when the second locking members are coupled to the female connector after the male connectors are coupled to the female connector, wherein the female connector has three or more ends, and the male connectors are respectively coupled to the ends, wherein the first locking member comprises:

a first locking body having a through-hole penetrated by the male connector; and first elastic bodies protruding from a lower portion of the first locking body, provided to be in contact with an inner peripheral surface of the chamber portion, and configured to provide the elastic force, wherein the second locking member comprises:

a second locking body coupled to an outer surface of the female connector and having a bead locking portion inserted into the chamber portion, with which an upper portion of the bead engages when the second locking body is coupled to the female connector; and second elastic bodies extending from two opposite sides of the second locking body and configured to provide elastic forces in a direction in which the second elastic bodies surround an outer peripheral surface of the female connector, wherein a second engagement hook protrudes inward from the second elastic body and engages with a fastening groove formed in an outer peripheral surface of the female connector.

14. The connector of claim 13, wherein the female connector is formed in a 'T' shape.

* * * * *